April 24, 1962 — L. F. KATTER — 3,031,048
RELEASABLE HOLDING DEVICE
Filed Nov. 10, 1958
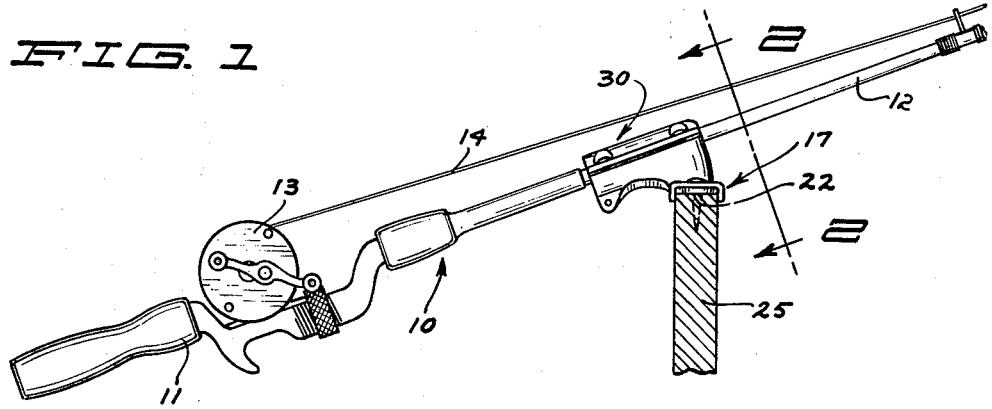
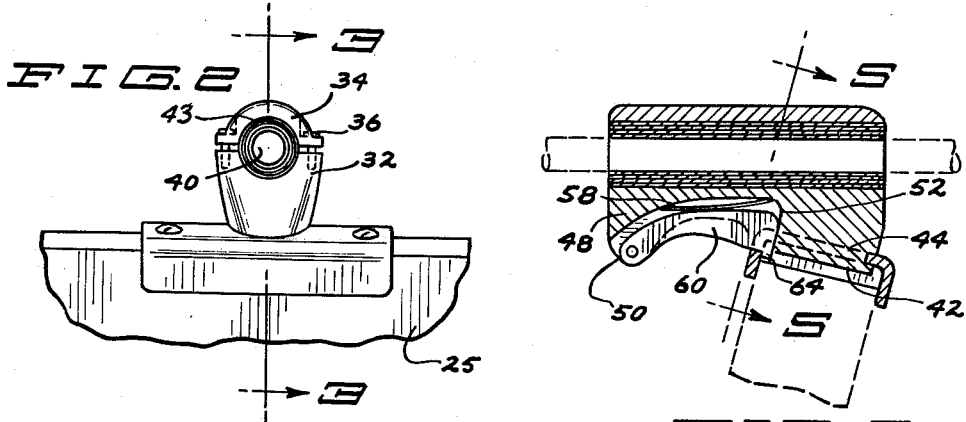
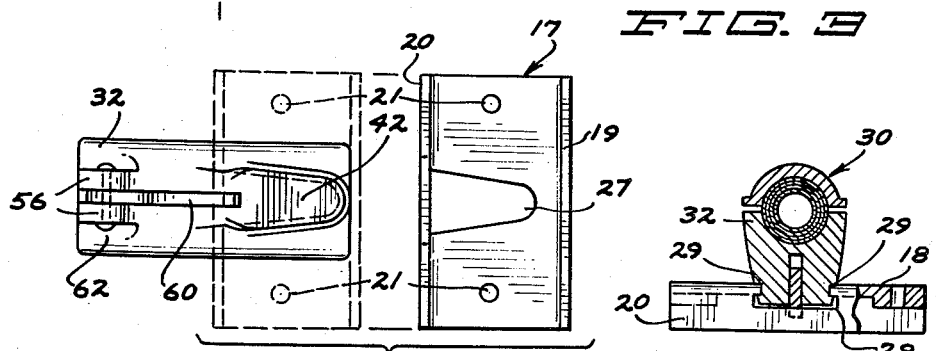
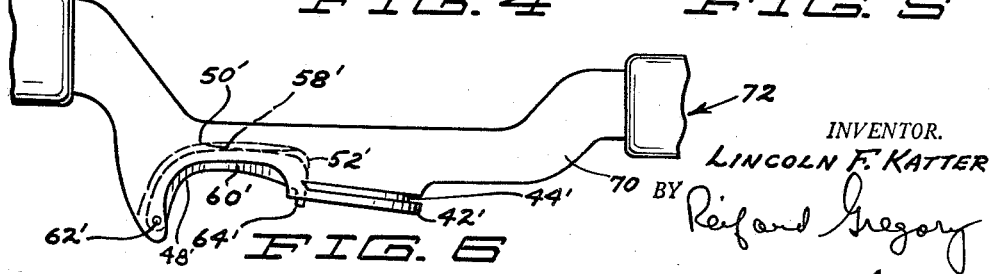
INVENTOR.
LINCOLN F. KATTER
BY
ATTORNEYS

United States Patent Office 3,031,048
Patented Apr. 24, 1962

3,031,048
RELEASABLE HOLDING DEVICE
Lincoln F. Katter, 5725 Interlachen Blvd.,
Minneapolis, Minn.
Filed Nov. 10, 1958, Ser. No. 772,842
2 Claims. (Cl. 189—36)

This invention relates to a device for detachably holding an object in a fixed position, and particular reference is had to a fishing rod as in a boat. Ordinarily when a fishing rod is set to one side in a boat it is jarred and moved about by the motion of the boat and is often stepped upon by persons in the boat. It is desirable therefore to have a device whereby a fishing rod may be very readily and conveniently held in a fixed position and be readily detached from such a position for use. Further in trolling or still fishing it is desirable to have a device for holding the fishing rod in fishing position. It is also desirable to have such a device for otherwise storing away a fishing rod, such as on a wall surface, as in a garage or other storage room.

It is an object of this invention therefore to provide a device for holding a fishing rod in a fixed position, as in a boat, comprising a bracket attached to the boat in a desirable location and a holding member having a fishing rod attached thereto with said holding member being readily secured to and detached from said bracket.

It is a further object of this invention to provide a device for holding a fishing rod in a fixed position comprising a slotted bracket and a fishing rod holding member being adapted to have a portion to be disposed into said slot and having a latch member normally in latching position for automatically latching said holding member into said slot, and means for quickly releasing said holding member from said slot in said bracket.

With reference to the previous object, it is also an object of this invention to provide said holding member of such a dimension that it will in no way interfere with the normal use of a fishing rod.

It is another object of this invention to provide a slotted bracket for mounting in a boat and a fishing rod having integral therewith a depending portion of small dimension adapted to be disposed into said slot in said bracket, and a spring pressed means in connection with said depending portion for automatically latching said depending portion and said rod in position in said bracket, said spring pressed means being adapted to provide a quick release of said rod from said bracket.

These and other objects and advantages of the invention will be fully set forth in the following description made in connection with the accompanying drawings in which like reference characters refer to similar parts throughout the several views and in which:

FIG. 1 is a view in perspective showing applicant's device in operating position holding a fishing rod as in a fishing position;

FIG. 2 is a view taken in front elevation on line 2—2 of FIG. 1, as indicated by the arrows;

FIG. 3 is a view in central longitudinal section taken on line 3—3 of FIG. 2, as indicated by the arrows;

FIG. 4 is a bottom plan view of applicant's device in separated position showing a portion thereof in a different position in dotted line;

FIG. 5 is a view substantially in vertical section taken on line 5—5 of FIG. 3, as indicated by the arrows; and FIG. 6 is a view in side elevation of a broken away portion of a fishing rod showing a modification of a portion of applicant's device.

Referring to the drawings, wherein like characters refer to identical parts throughout the various views, a fishing rod 10 is shown. Said fishing rod 10 is of a common and ordinarily used variety having a handle 11 and a barrel 12, with a reel 13 mounted on said handle, and a line 14 strung along said rod.

Said rod 10 is illustrated secured in applicant's holding device. Applicant's holding device in the embodiment here presented comprises a bracket 17 here shown as being a plate bracket substantially U-shaped in transverse section having a top surface 18, a rear wall 19, and a front wall 20. Said top surface 18 has spaced apertures 21 therein to receive screws 22 used to secure the same in position. In FIG. 1 said bracket 17 is indicated as being secured to a broken away boat portion 25.

Extending transversely centrally through the top surface of said bracket 17 is a slot 27. Said slot may be variously formed, but is here shown to be substantially V-shaped in form having a rounded inner end portion and an open end merging into a longitudinal slot 28 in the upper portion of said front wall 20. Said slot 28 is somewhat wider than said slot 27 at its open end whereby flanges 29 are formed at either side of said slot, and in effect a flange is present about said slot. As indicated in FIGS. 1 and 3, said bracket is formed with sufficient thickness at either end so that when flush mounted on a surface there is space open beneath said slot for receiving a holding member to be disposed therein and which is hereinafter described.

Cooperating with said bracket 17 is a holding member 30. Said holding member may be variously formed for holding a variety of objects. In the embodiment of the applicant's invention here presented, it is formed particularly for holding a fishing rod and is shown having a central body portion 32 substantially rectangular in horizontal section having an upper removable mating or cap portion 34 secured to said central portion by screws 36. Said cap and central body portion in assembled condition as indicated in FIG. 3 have a cylindrical bore 40 longitudinally therethrough. Said bore will be of a size to permit the barrel of a fishing rod to be disposed therethrough and held therein, as indicated in FIG. 1. For a resilient gripping of a fishing rod barrel, a sheet of resilient material 43, such as of plastic or rubber material, is rolled up and inserted in said bore and will be wound about a fishing rod barrel disposed in said bore. As here shown, said cap portion 34 has a convexly curved upper surface with flange portions mating with the sides of said central body portion 32 into which are disposed said screws 36.

Said central body portion 32 is here shown tapered somewhat downwardly and has formed therebelow a depending portion 42 of substantially the form of said slot 27 but somewhat oversized in relation to said slot. The lower surface of said depending portion lies in a plane inclined at an angle to the horizontal extending upwardly and rearwardly. About the sides and front of said depending portion 42 is a groove 44 parallel to the plane of the lower surface of said depending portion and having a width to accommodate the thickness of said flanges 29 whereby the flange portion about said slot 27 is receivable into said groove 44.

Said central body portion 32 at its underside has a longitudinally extending concave portion 48 terminating in said depending portion 42. A slot 50 is formed in said concave portion having a concave bottom surface and having its inner end extending somewhat into said depending portion 42, as indicated in FIGS. 3 and 4, and having a substantially straight wall 52 at said inner end inclined upwardly and somewhat rearwardly. Formed at either side of said slot 50 at its outer end are spaced ears 56. Adapted to be supported on the bottom surface of said slot 50 is a plate spring 58. Disposed in said slot 50 is a convex concave trigger-shaped lever 60 having its bottom convexly formed. Said lever 60 is pivoted at one end by a pin 62 disposed through said ears 56 with said end of said lever being therebetween. The free end of said lever 60 has a substantially straight end wall which engages the end wall 52 when pivoted outwardly of said slot 50 for a short distance. Thus said end wall 52 acts as a stop member for the free end of said lever. Extending outwardly from the free end portion of said lever as a continuation thereof is a lug portion 64 forming a latch. Said latch has a curved outer end surface and a straight line inner end surface. When said lever is disposed in said slot 50 in operating position, said spring will serve to urge said lever outwardly to be normally in latching position, as will be disclosed in the operation to be hereinafter set forth. Thus said latch 64 will normally extend beyond the bottom surface of said depending portion 42.

In operation, the bracket 17 will be secured in any desirable location, such as in a boat where it would be convenient to carry a fishing rod. In FIG. 1, said bracket 17 is shown in position, as in a boat, for holding a fishing rod in fishing position. An additional bracket will be mounted in a boat to hold the fishing rod in a storage position. Other like brackets may be secured on a wall surface in a storage place, such as in a garage or a rumpus room where fishing rods may be kept when not in use.

The cap 34 will be removed from the holding member 30 and the barrel of fishing rod 10 will be disposed in said holding member to lie in bore 40 formed by the mating of said cap 34 and body portion 32. If the barrel of the fishing rod is of a smaller diameter than said bore, said resilient member 43 may be wound about said bore before being placed in said holding member so that said barrel will be positively gripped. Said holding member 30 is of relatively small size and is positioned on fishing rod 10 in a place where it will in no way interfere with the normal use of the fishing rod. When it is desired to set aside the fishing rod, said depending portion 42 will be slid into the slotted portion of said bracket 17 with the flange about the slot being received into said groove 44. Said latch 64 will be automatically depressed by the portion of the front wall 20 below said groove 28 and will engage the inner side of said front wall to positively lock said holding member in latched position in said bracket 17. Thus by a simple forward sliding motion the holding member 30 is latched in position in bracket 17. The rod is thus securely held in a desired position, such as in a fishing or in a stored position, and will not be jarred or moved about with the movement of the boat nor inadvertently stepped upon by the person or persons in the boat. Thus a person may troll or still fish without having to hold the rod in hand. To remove the fishing rod for use, such as when the rod is positioned for trolling or still fishing and there is a bite indicated on the line, the operator's left hand is placed about the barrel of the fishing rod with a finger engaging said trigger lever 60 and depressing the same slightly to move the latch 64 out of engagement with the front wall 20. The rod is then simply moved rearwardly with the right hand and is thus quickly and easily removed from said bracket 17 and is held freely in fishing position. The fishing rod in like manner is quickly and easily removed from a bracket when held in stored position.

With reference to FIG. 6, a modification is shown in which applicant's holding member 30, shown and described as an attachment, is here indicated in identical structure as forming an integral part of a fishing rod 72 by being formed as a part of the handle 70 thereof. In said modification a handle portion 70 of a broken away portion of a fishing rod 72 is shown. The following parts are identical with parts previously described and are here indicated with the previous used characters primed. A depending portion 42' is formed having a groove 44' thereabout and in a concave portion 48' of said handle 70 is a slot 50' having a substantially straight end wall 52'. Seated in said slot is a plate spring 58' and disposed in said slot is a trigger lever 60' and having a depending latch 64'. The operation in the use of this modified portion of applicant's holding device is identical with the use of the holding member 30 previously described.

Thus it is seen that I have provided a very simple and easily constructed holding device for a fishing rod whereby it may be quickly placed and held fixed in a desired position, such as in a fishing or stored position, and easily removed for use. Applicant's holding device is relatively small in size and in no way interfers with the normal use of a fishing rod.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. A releasable holding device having in combination a bracket comprising a plate member having a forward depending wall portion, an open ended slot in said plate member having its open end portion extending into said wall portion transversely thereof for some distance, the lower portion of said open end of said slot in said wall portion having a greater width than the upper portion thereof forming a flange with the inner wall portion of said slot, a holding member releasingly secured in said slot comprising a depending body portion, a groove substantially about said depending body portion, said groove having therein said flange portion of said slot, a trigger lever, means for pivoting said lever at one end thereof to a bottom portion of said holding member remote from said groove to move said lever in a direction at right angles to the plane of said depending body, without changing the plane of said body portion, a slot extending into said groove portion disposed in a direction at right angles to the plane of said groove, the free end of said lever extending into said last mentioned slot, a depending lug portion at the free end of said lever and having an inclined forward wall and a vertical rear wall, a spring disposed within said body portion above said lever urging said lug portion in an outward locking position disposing said depending lug portion within said first mentioned slot to engage the inner side of said depending wall of said plate member to releasingly lock said holding member in said bracket.

2. A releasable holding device having in combination a bracket comprising a plate member having a forward depending wall portion, an open ended slot formed in said plate member having its open end extending into said depending wall portion, the lower portion of said open end of said slot having a greater width than the upper end thereof thus forming a flange at the inner wall portion of said slot, a holding member adapted to be releasingly secured in said slot comprising a forward depending portion, a groove substantially about said forward depending portion receiving therein said flange portion of said slot, a lever, said lever being pivoted at one end thereof to a bottom portion of said holding member remote from said groove for movement of said lever in a direction at right angles to the plane of said groove without changing the plane of said depending portion, a second slot extending partially into said depending portion, said second slot being disposed to be at right angles to the plane of said groove, the free end of said lever being movable within said second slot, the forward wall of said second slot engaging the adjacent end of said lever to restrict the movement of said lever to be within said second slot, a depending lug at the free end of said lever movable within said second slot, said lug having an inclined forward wall and a vertical rear wall, a spring within said bottom portion urging said lever to extend outwardly of said second slot to dispose said lug within said first mentioned slot in releasing engagement with the depending wall portion of said plate member.

References Cited in the file of this patent

UNITED STATES PATENTS

| | | |
|---|---|---|
| 2,519,851 | Reynolds | Aug. 22, 1950 |
| 2,581,671 | Katter | Jan. 8, 1952 |
| 2,698,725 | Triplett | Jan. 4, 1955 |
| 2,891,745 | Seyfried et al. | June 23, 1959 |